(12) United States Patent
Mahnad (10) Patent No.: US 8,339,907 B2
(45) Date of Patent: Dec. 25, 2012

(54) OPTICAL STORAGE FOCUS SERVO SYSTEM AND METHOD OF CONTROLLING SAME

(75) Inventor: Faramarz Mahnad, Brookline, MA (US)

(73) Assignee: Oracle International Corporation, Redwood City, CA (US)

( * ) Notice: Subject to any disclaimer, the term of this patent is extended or adjusted under 35 U.S.C. 154(b) by 127 days.

(21) Appl. No.: 12/885,932

(22) Filed: Sep. 20, 2010

(65) Prior Publication Data

US 2012/0069726 A1   Mar. 22, 2012

(51) Int. Cl.
*G11B 7/00* (2006.01)
(52) U.S. Cl. .................. 369/44.23; 369/53.23
(58) Field of Classification Search .......... 369/44.11, 369/44.23, 53.23, 53.28, 112.23; 250/201.5
See application file for complete search history.

(56) References Cited

U.S. PATENT DOCUMENTS 7,247,827 B1 *   7/2007   Hwang et al. .............. 250/201.5
2004/0207944 A1   10/2004   Ichimura 2005/0006558 A1   1/2005   Wu et al.
2008/0175107 A1   7/2008   Kuijper et al.
2010/0195453 A1 *   8/2010   Miyamoto et al. ......... 369/44.11

FOREIGN PATENT DOCUMENTS

EP   2182515 A1   5/2010

OTHER PUBLICATIONS

International Search Report dated Dec. 7, 2011 from the corresponding International Application No. PCT/US2011/051720, pp. 1-11.

* cited by examiner

*Primary Examiner* — Wayne Young
*Assistant Examiner* — Brenda Bernardi
(74) *Attorney, Agent, or Firm* — Brooks Kushman P.C.

(57) ABSTRACT

An optical storage focus servo system may include an optical pickup unit that includes an astigmatic focusing lens, a focusing actuator that controls a position of the lens relative to an optical media, and a plurality of detectors that detect an intensity and shape of a reflected beam from the media. The system may also include a controller that controls the focusing actuator based on the intensity and shape of the reflected beam.

14 Claims, 8 Drawing Sheets

OPTICAL STORAGE FOCUS SERVO SYSTEM AND METHOD OF CONTROLLING SAME

BACKGROUND

Current optical storage device optical pickup units and associated focusing servo systems provide a limited range of continuous focusing operation needed for the proper recording of data on media. This limited operational range is susceptible to media defects and other external disturbances that may violate the specified limits and cause the loss of valuable data-degrading the performance of the optical storage device.

SUMMARY

An optical storage focus servo system may include a controller that receives information representing an intensity and shape of a beam reflected from an optical media. The controller may also generate a focus error signal based on the information representing the intensity and shape of the reflected beam, and control a position of an astigmatic focusing lens relative to the optical media based on the focus error signal.

DETAILED DESCRIPTION

Optical recording devices such as optical disks and optical tape drives commonly use an astigmatic lens element in the optical pickup unit (OPU) to generate a focus error signal for the device servo and channel subsystems. This focus error signal is then used to control the lens focusing actuator element of the OPU to ensure proper and continuous focusing of the recording beam to the recording media for optimal data recording and retrieval operation.

Figure 1:
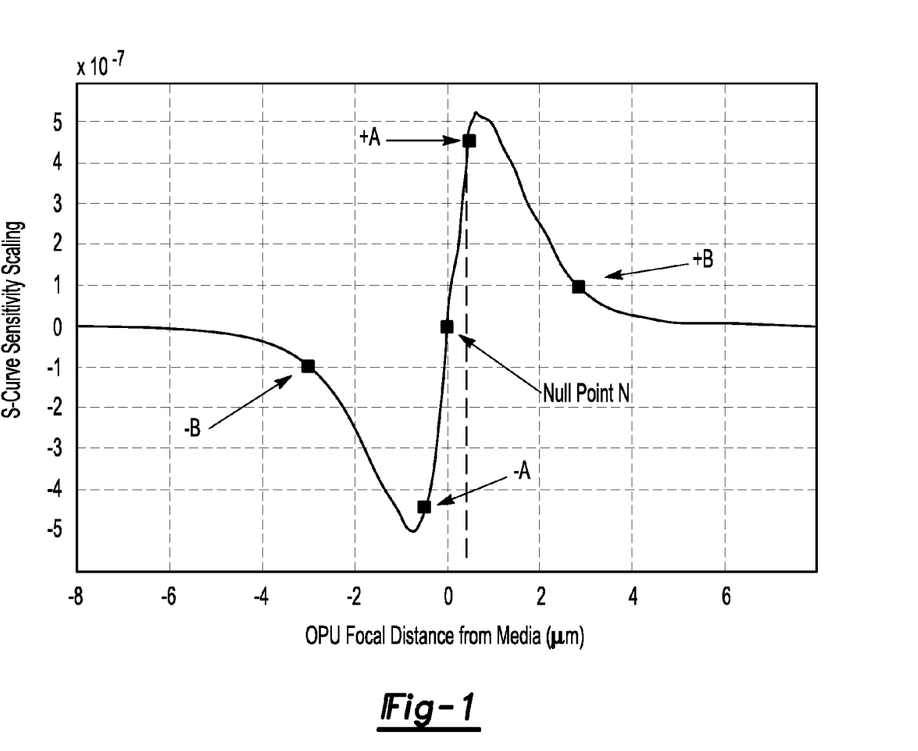
FIG. 1 is a plot illustrating S-curve sensitivity scaling versus optical pickup unit focal distance from media.

FIG. 1 illustrates a sensitivity plot of a typical focusing error signal to the actual focusing distance of the objective lens of a typical OPU by the above method. This nonlinear signal, commonly referred to as an S-curve, is based on the shape of a beam reflected from the optical media. It shows the limited linear range between ±A (about one micron in length) used by present focus servo systems to null the focus error signal at the optimal point N for proper operation of the OPU. Any media defect or external disturbance that extends beyond this linear region may cause a loss of focus (and hence data) and force the OPU into a time consuming and complicated initialization mode of operation to regain focus.

Figure 2:
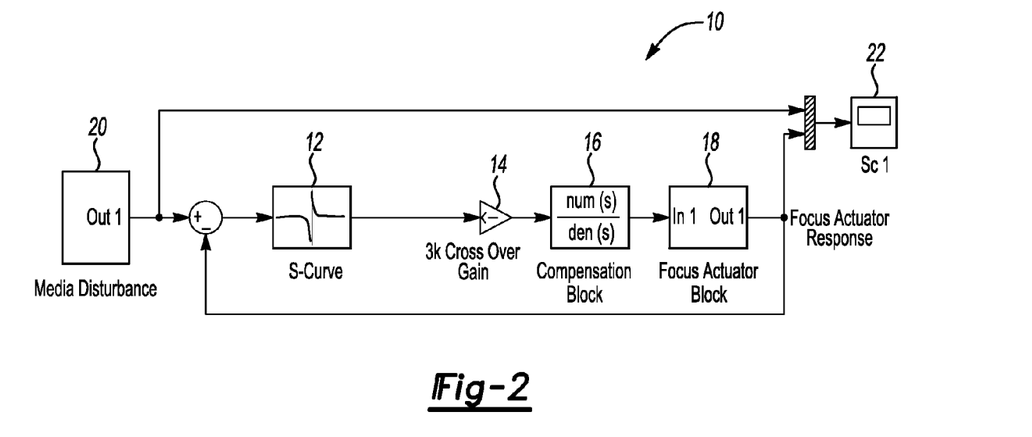
FIG. 2 is a block diagram of a focus servo system.

FIG. 2 shows a typical focus servo system 10 in block diagram format, which incorporates a nonlinear S-curve block 12, a gain block 14, a servo electronic compensation block 16, and OPU objective lens focusing electromechanical actuator block 18. A difference between the output of a media disturbance block 20 and the output of the actuator block 18 is input to the S-curve block 12. The output of the S-curve block 12 is input to the gain block 14. The output of the gain block 14 is input to the compensation block 16. The output of the compensation block 16 is input to the actuator block 18. The output of the actuator block 18 and media disturbance block 20 is multiplexed as input to a display device 22.

Figure 3:
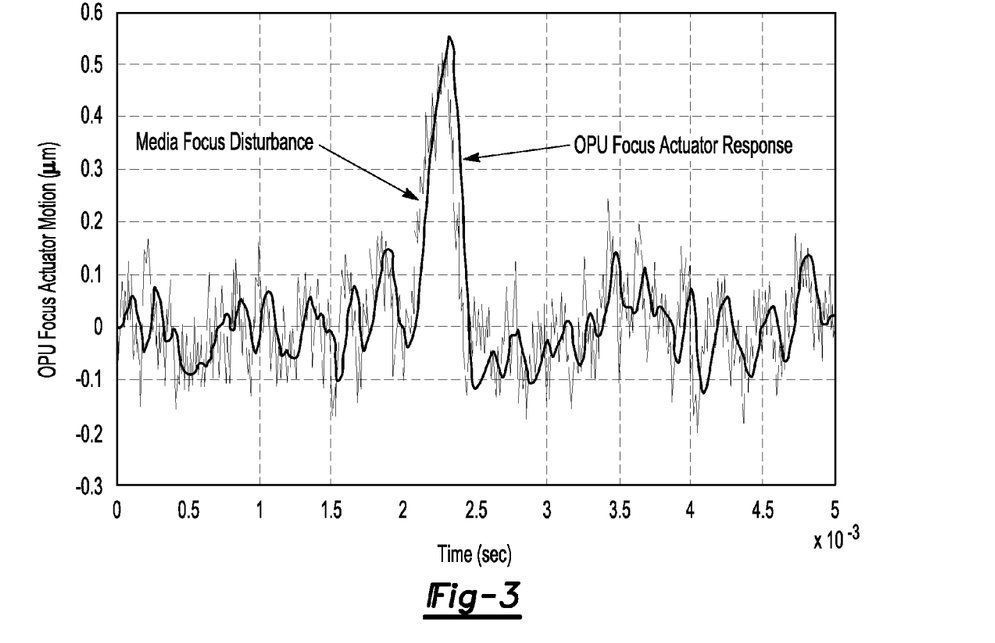
FIG. 3 is a plot illustrating optical pickup unit focus actuator motion versus time for the focus servo system illustrated in FIG. 2 for disturbances within the ±A range illustrated in FIG. 1.

FIG. 3 illustrates OPU focus actuator responses to media focus disturbances within the ±A range (e.g., less than ±0.5 μm). The servo system 10 (FIG. 2) ensures the graceful settling of the OPU to the null focusing region (±0.1 μm) immediately after the disturbance has passed by the OPU.

Figure 4:
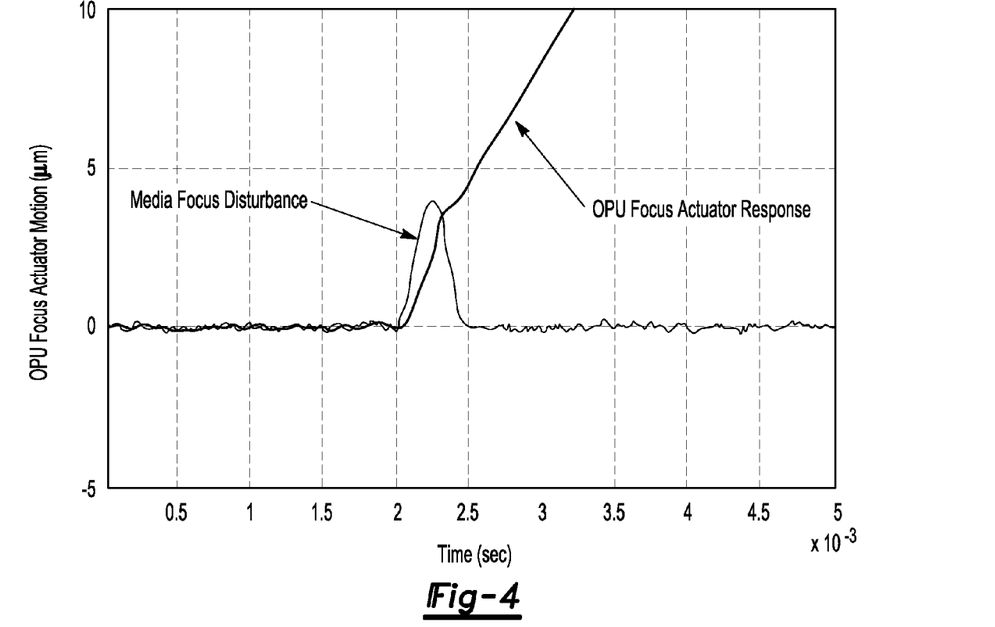
FIG. 4 is a plot illustrating optical pickup unit focus actuator motion versus time for the focus servo system illustrated in FIG. 2 for disturbances outside the ±A range illustrated in FIG. 1.

FIG. 4 illustrates OPU focus actuator responses to media focus disturbances outside the ±A range (e.g., greater than ±0.5 μm). A disturbance (encountered between 2 and 2.5 sec) that extends beyond the S-curve linear region causes a complete loss of focus. The servo system 10 (FIG. 2) at this juncture must reinitialize and calibrate in order to readjust and find the null focusing region again. Such sensitivity to disturbances imposes stringent requirements on media surface quality and device electromechanical performance, especially in the case of optical tape drives where for data recovery, the tape must be stopped and rewound to retrieve the immediate data around defect areas (if recovery is possible at all).

An in-depth study of the S-curve has revealed extended properties of this signal beyond the linear region. Referring again to FIG. 1, the sections bounded by +A to +B and −A to −B also exhibit sensitivity to the actual distance of the media surface to the focal point of the optical lens. These regions, however, are neither liner nor have a same slope (polarity) as the region +A to −A. They, nevertheless, may be used to extend the capture range of a focus servo system through signal processing.

Certain embodiments may provide signal processing methods and systems to extend and/or enhance the operational range of focus servo systems for typical optical storage devices that incorporate an astigmatic lens element in their optical beam path for generating a focus error signal. Applying the raw S-curve signal beyond the liner region, without proper signal processing however, may present issues for a focus servo system. First, it may create a positive slope in the focus servo loop. Second, it may result in nonlinear system behavior. To understand the effect of the first phenomenon, a discussion of the dynamic behavior of the fundamental states of the system (namely focus position, error and velocity under specific boundary conditions) may be helpful.

Figure 5:
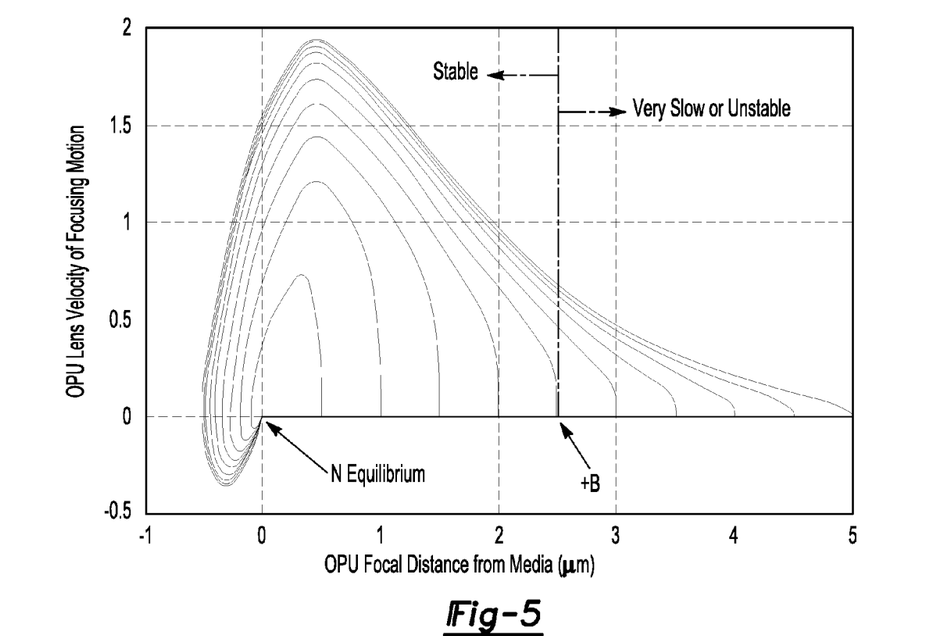
FIG. 5 is a plot of optical pickup unit lens focusing motion velocity versus optical pickup unit focal distance from media for different initial distance conditions.

FIG. 5 illustrates the state trajectory of actuator velocity versus focal distance from the media under the −B, +B boundary conditions for steps of 1, 2, 3, 4, etc. microns in amplitude. This plot shows the conditional stability of the system and motion of the states toward the stable ±A negative feedback region, and eventually to the desired focus null position (i.e., N) if the initial state's boundary conditions are met and are within the ±B value. Beyond the given boundary conditions, however, the system may become sluggish or unstable.

The effect of the second phenomenon mentioned above is also revealed in FIG. 5. That is, the nonlinearity of the error signal impacts residual increases in settling response time to a disturbance. This effect is considered to be negligible.

Figure 6:
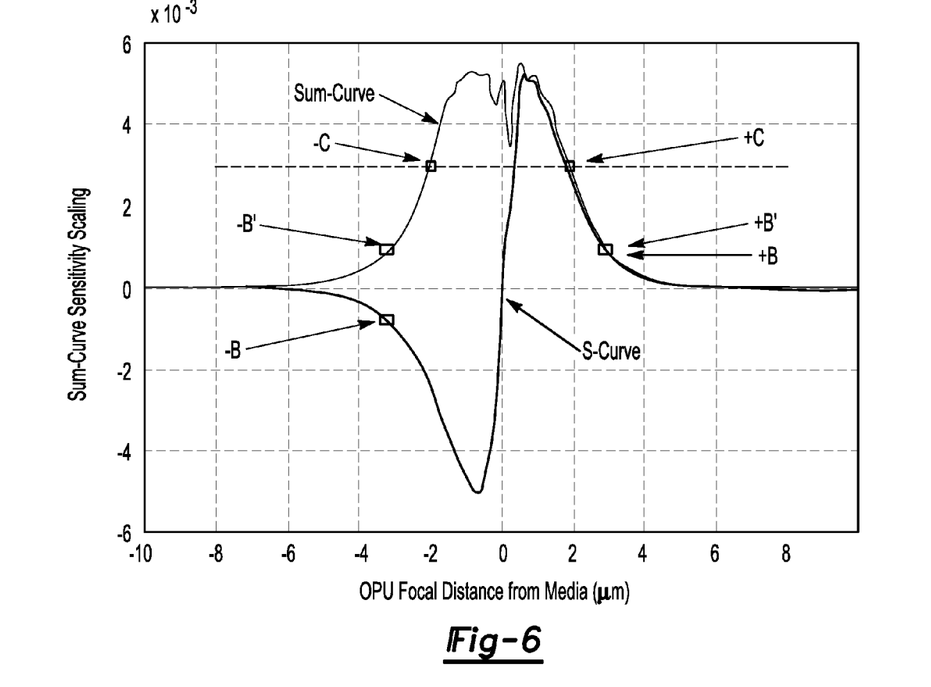
FIG. 6 is a plot of Sum-curve sensitivity scaling versus optical pickup unit focal distance from media.

Accordingly, it is permissible to incorporate the extended sections of the S-curve to expand the operational capabilities of the focus servo system by applying appropriate signal processing and servo design to ensure compliance to boundary conditions. This may be achieved by application of another signal available from the optical detector elements of the OPU, commonly referred to as the Sum-curve signal. The Sum-curve signal is based on the intensity of a beam reflected from the optical media. The relationship between the S-curve and Sum-curve sensitivity behavior as a function of distance between the objective lens focal point and recording media is illustrated in FIG. 6.

Figure 7A:
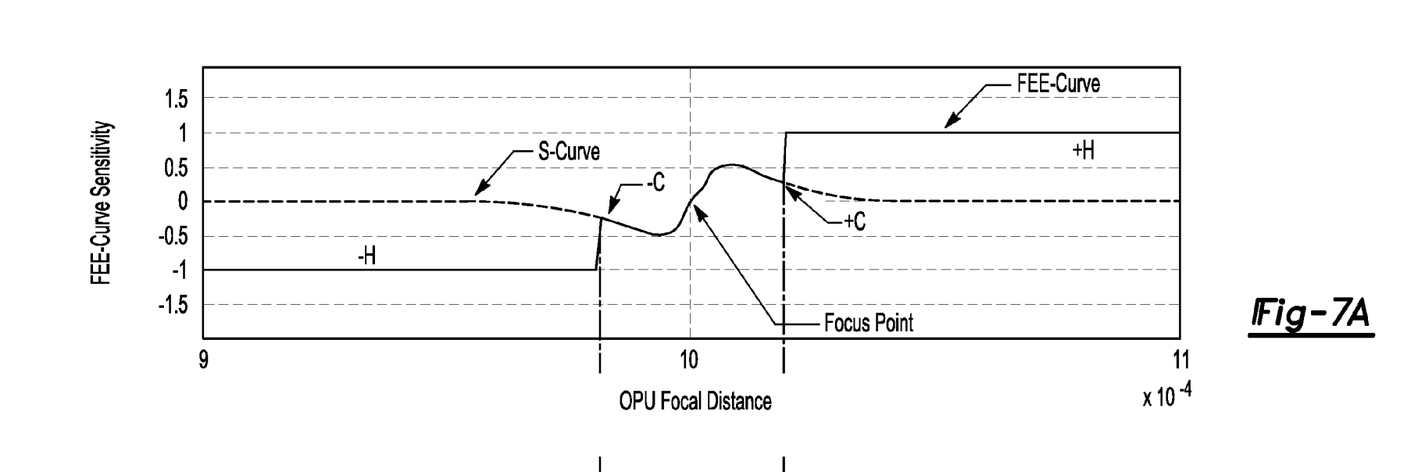
FIG. 7A is a plot of focus error estimator curve sensitivity versus optical pickup unit focal distance.
Figure 7B:
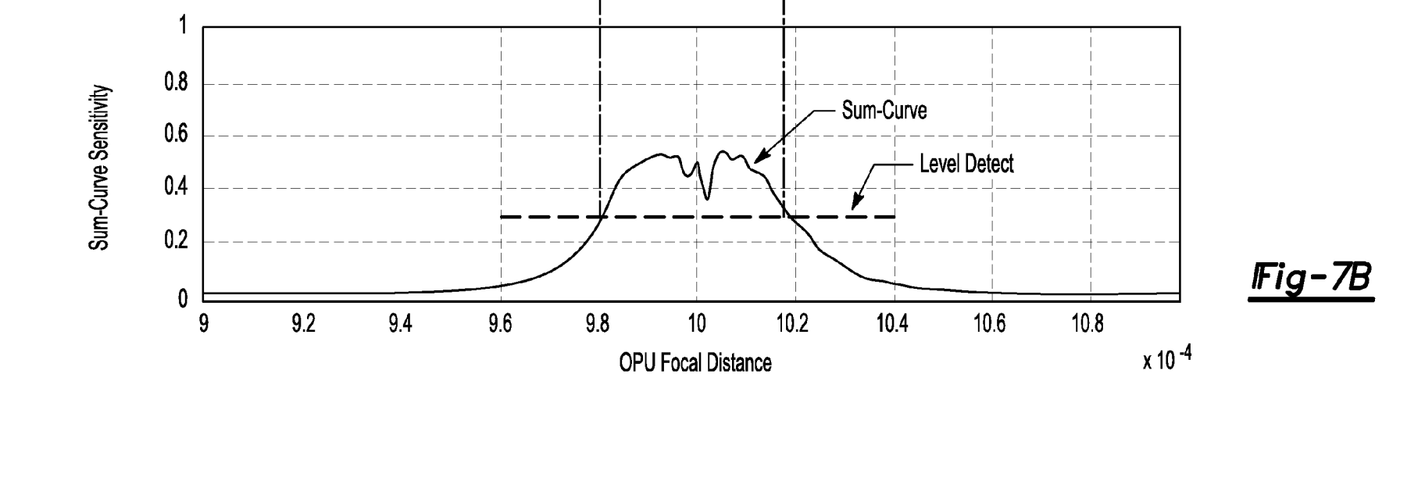
FIG. 7B is a plot of Sum-curve sensitivity versus optical pickup unit focal distance.
Figure 8:
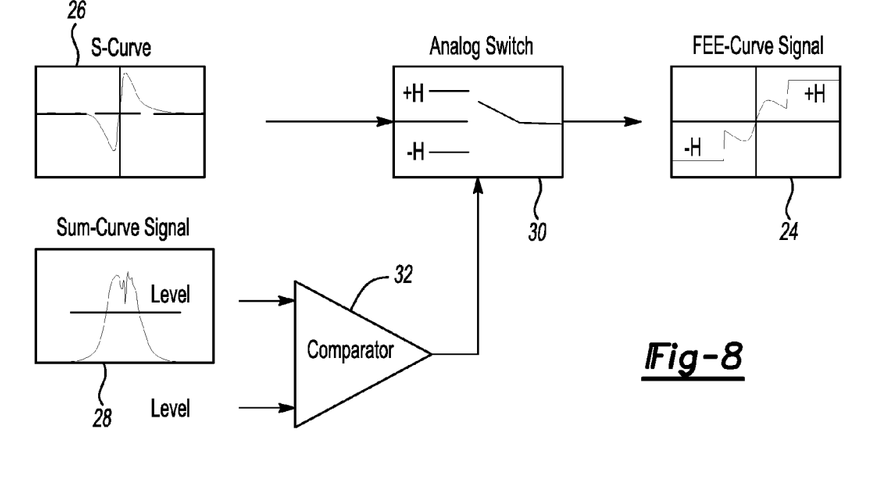
FIG. 8 is a block diagram of a focus error estimator signal generator.

Referring to FIGS. 7A, 7B and 8, certain embodiments of a servo architecture provide a focus error estimator (FEE) signal 24 generated as a function of both S- and Sum-curves 26, 28. The FEE signal 24 tracks the S-curve 26 precisely between points ±C or is switched to constant values of ±H via switch 30. The sign of the H value is the same as the sign of the last tracked S-curve value. The value of H is determined by the media disturbance characteristics and is set experimentally. (In this example, H is set to a value twice that of the threshold A.) By applying real time signal processing, the FEE signal is switched between these three states (−H, S-curve, +H) based on a Sum-curve level detector's output logic 32. The value of H, in other embodiments, may be generated from a function that is based on the behavior of the sensitivity curve(s). That is, the value of H need not be constant.

The FEE signal allows the usage of extended nonlinear sections of the S-curve because it ensures that boundary conditions set forth by the above analysis are not violated. By design, the S-curve is not used in FEE construction beyond the points ±C of FIG. 7A. Therefore, the control signal remains within the ±B boundary values of FIG. 1. Beyond the ±C boundaries, control signals (i.e., ±H) that have appropriate signs and values are used to ensure stability and a controlled system response to larger initial conditions or disturbances.

Figure 9:
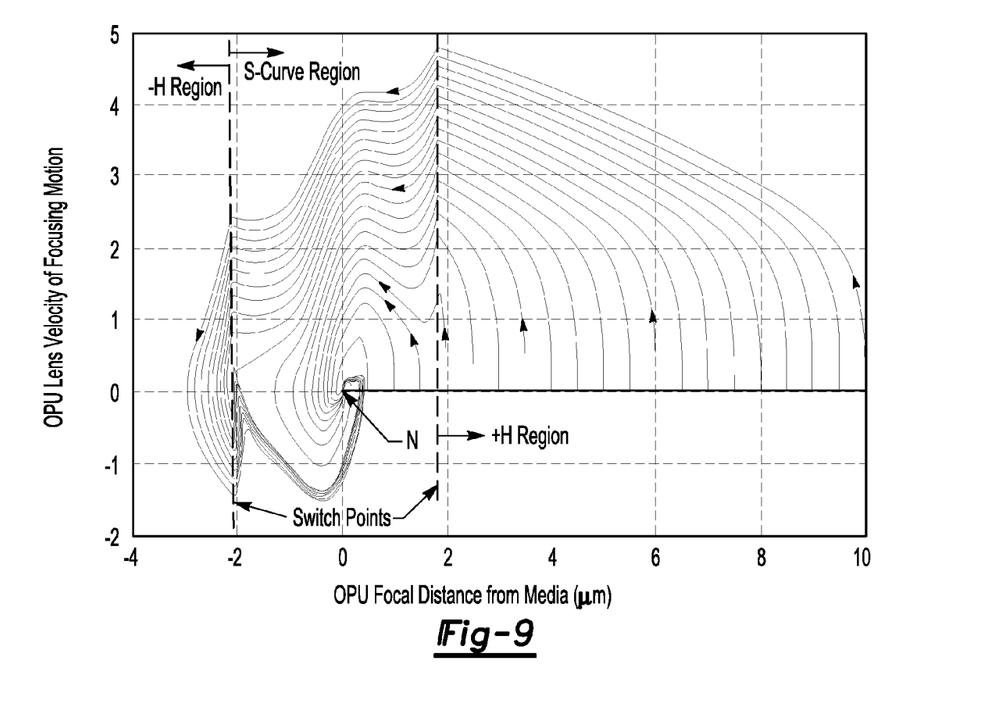
FIG. 9 is another plot of optical pickup unit lens focusing motion velocity versus optical pickup unit focal distance from media for different initial distance conditions.

FIG. 9 illustrates the state trajectory of actuator velocity versus focal distance from the media for steps of 1, 2, 3, 4, etc. microns in amplitude for the proposed architecture. The servo system exhibits robust dynamic behavior for different initial conditions even beyond the ±B boundaries (FIG. 8).

Figure 10:
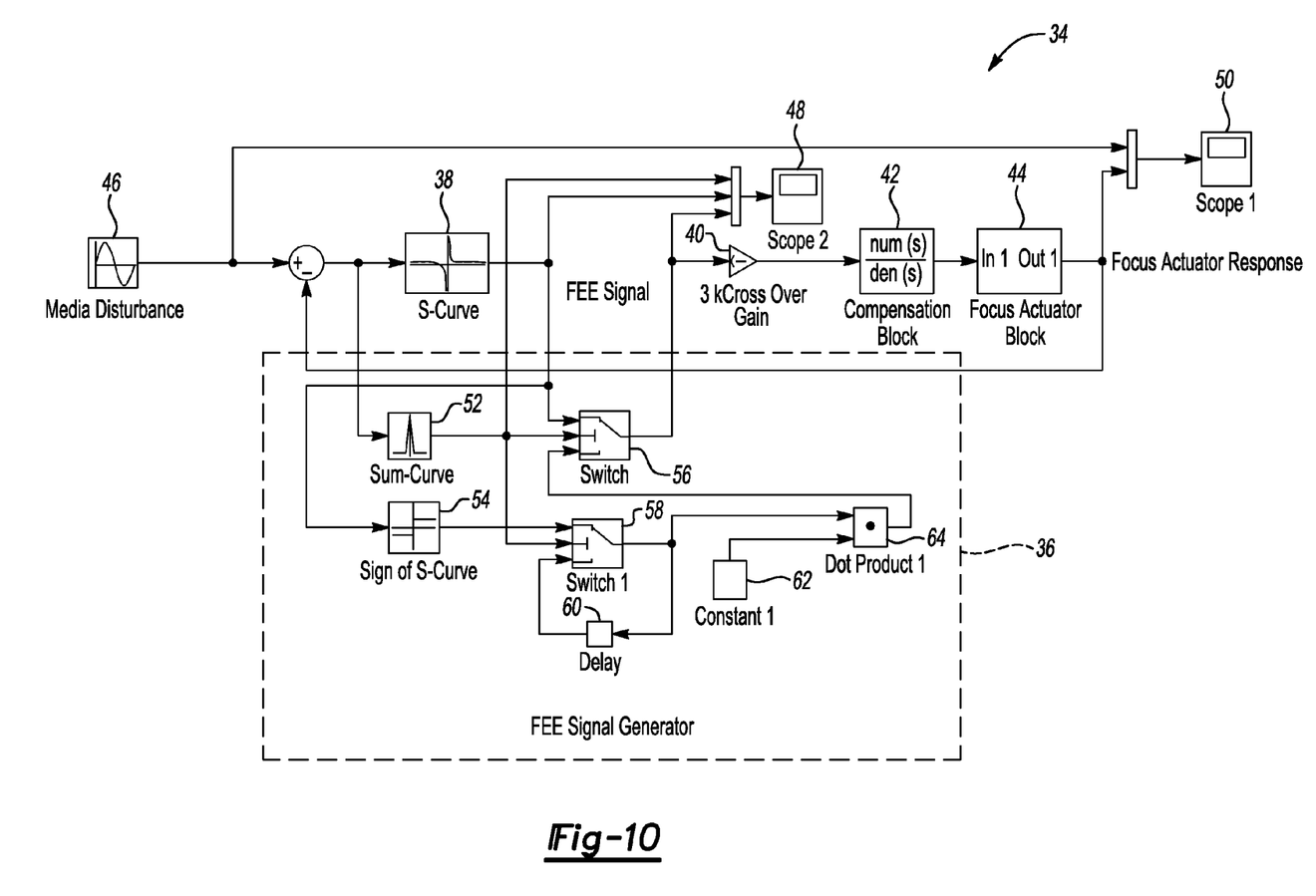
FIG. 10 is another block diagram of a focus servo system.

FIG. 10 shows another focus servo system 34 in block diagram format. The system 34 includes a FEE signal generator portion 36, a nonlinear S-curve block 38, a gain block 40, a servo electronic compensation block 42 and an OPU objective lens focusing electromechanical actuator block 44. A difference between the output of a media disturbance block 46 and the output of the actuator block 44 is input to the FEE signal generator portion 36 and S-curve block 38. The output of the S-curve block 38 is input to the FEE signal generator portion 36. The output of the FEE signal generator portion 36 and the S-curve block 38 is multiplexed as input to a scope 48. The output of the FEE signal generator portion 36 is also input to the gain block 40. The output of the gain block 40 is input to the compensation block 42. The output of the compensation block 42 is input to the actuator block 44. The output of the actuator block 44 and media disturbance block 46 is multiplexed as input to a display device 50.

The FEE signal generator portion 36 includes a Sum-curve block 52, a sign of the S-curve block 54, switches 56, 58, a delay block 60, a constant block 62, and a multiplier block 64. The difference between the output of the media disturbance block 46 and the output of the actuator block 44 is input to the Sum-curve block 52. The output of the S-curve block 38 is input to the sign of the S-curve block 54. The output of the S-curve block 38, Sum-curve block 52 and multiplier block 64 is input to the switch 56. The output of the switch 56 is input to the gain block 40 and scope 48. The output of the Sum-curve block 52, sign of the S-curve block 54 and delay block 60 is input to the switch 58. The output of the switch 58 is input to the delay block 60 and the dot product block 64. The output of the constant block 62 is also input to the dot product block 64. Of course, other arrangements and configurations are also possible.

Figure 11:
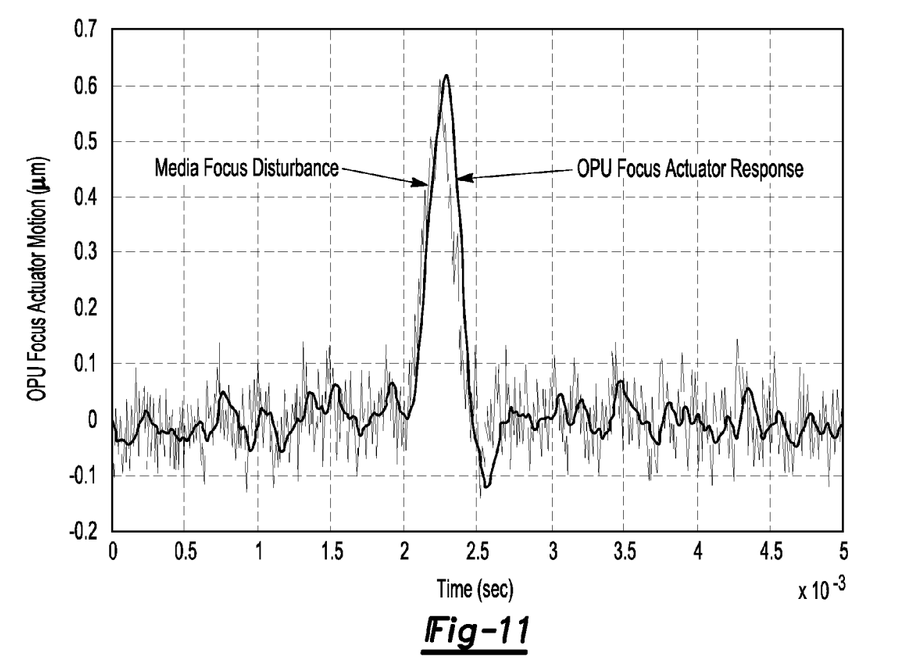
FIG. 11 is a plot illustrating optical pickup unit focus actuator motion versus time for the focus servo system illustrated in FIG. 10 for disturbances within the ±A range illustrated in FIG. 1.
Figure 12:
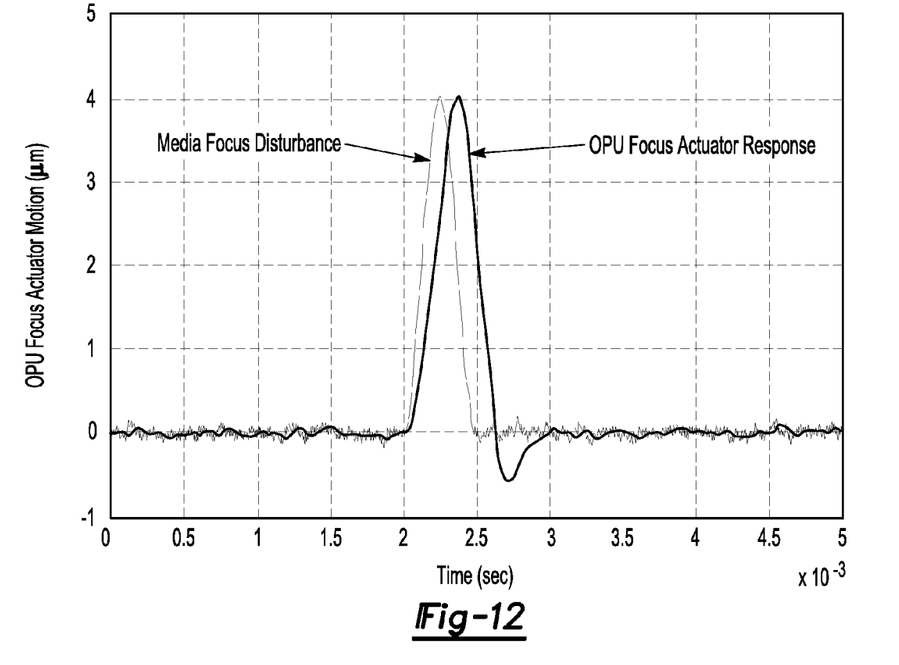
FIG. 12 is a plot illustrating optical pickup unit focus actuator motion versus time for the focus servo system illustrated in FIG. 10 for disturbances outside the ±A range illustrated in FIG. 1.

FIGS. 11 and 12 show the response of the focus servo system 34 (FIG. 10) to disturbances within the ±A range (FIG. 11) and outside the ±A range (FIG. 12). The focus servo system 34 is capable of brining the objective lens to the optimal focal position in the presence of large disturbances, gracefully and in a timely manner as illustrated in FIG. 11.

Figure 13:
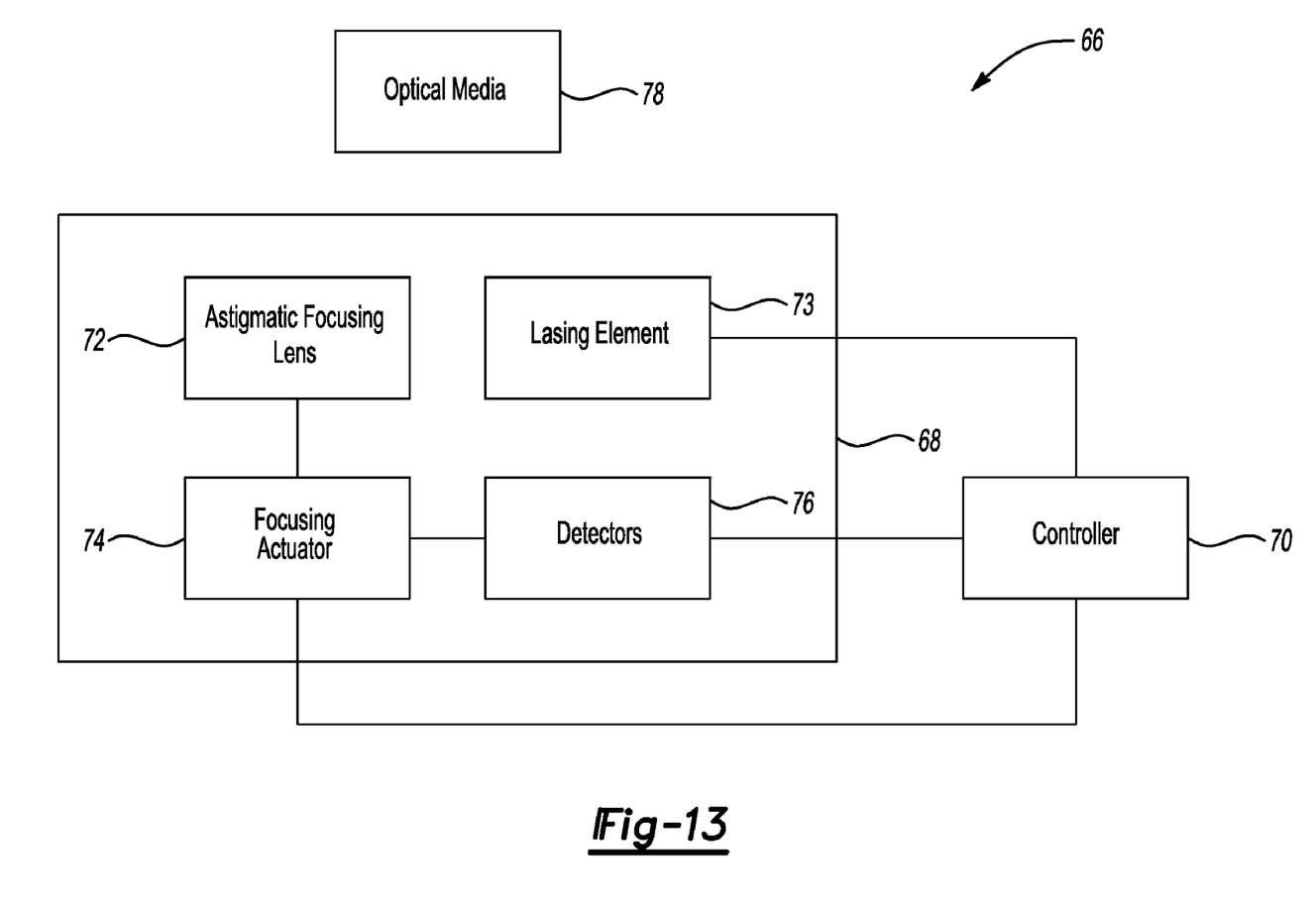
FIG. 13 is a block diagram of a focus servo system.

FIG. 13 schematically illustrates certain elements of an embodiment of a focus servo system 66, which includes an optical pick up unit 68 and a controller 70. The optical pick up unit 68 includes an astigmatic focusing lens 72, a lasing element 73, a focusing actuator 74, and a plurality of detectors 76. The lasing element 73 generates a beam that is focused via the lens 72 onto an optical media 78. The detectors 76 detect an intensity and shape of the reflected beam from the optical media 78. As described above, the controller generates a FEE signal based on the intensity and shape of the reflected beam, which is used to control the relative position of the lens 72 to the optical media 78 via the focusing actuator 74.

While embodiments of the invention have been illustrated and described, it is not intended that these embodiments illustrate and describe all possible forms of the invention. The words used in the specification are words of description rather than limitation, and it is understood that various changes may be made without departing from the spirit and scope of the invention.

What is claimed:

1. An optical storage focus servo system comprising:
   an optical pickup unit including an astigmatic focusing lens, a focusing actuator that controls a position of the lens relative to an optical media, and a plurality of detectors configured to detect an intensity and shape of a reflected beam from the media; and
   a controller configured to generate a focus error signal based on the intensity and shape of the reflected beam, generate a sum-curve signal based on the intensity of the reflected beam, and an s-curve signal based on the shape of the reflected beam, wherein non-linear portions of the focus error signal are used as input to control the focusing actuator, wherein the focus error signal tracks the s-curve signal for values of the sum-curve signal greater than a predefined threshold, and wherein the focus error signal has a constant magnitude for values of the sum-curve signal less than the predefined threshold.

2. The system of claim 1 wherein a sign of the constant magnitude depends on a sign of the last tracked s-curve signal value.

3. The system of claim 1 wherein the value of the constant magnitude depends on surface quality characteristics of the optical media.

4. The system of claim 1 wherein the controller is further configured to maintain uninterrupted control of the focusing actuator in the presence of disturbances that result in non-linear behavior of the focus error signal.

5. The system of claim 1 wherein the controller is further configured to write data to or retrieve data from the optical media in a vicinity of defects on the optical media that result in non-linear behavior of the focus error signal.

6. The system of claim 1 wherein the controller is further configured to write data to or retrieve data from the optical media in a vicinity of defects on the optical media that result in non-linear behavior of the s-curve signal.

7. An optical storage focus servo system comprising:
a controller configured to receive information representing an intensity and shape of a beam reflected from an optical media, to generate a focus error signal based on the information representing the intensity and shape of the reflected beam, a sum-curve signal based on the information representing the intensity of the reflected beam, and an s-curve signal based on the information representing the shape of the reflected beam, and to control a position of an astigmatic focusing lens relative to the optical media based on the focus error signal, wherein the focus error signal tracks the s-curve signal for values of the sum-curve signal greater than a predefined threshold and wherein the focus error signal has a constant magnitude for values of the sum-curve signal less than the predefined threshold.

8. The system of claim 7 wherein the controller is further configured to maintain uninterrupted control of the astigmatic focusing lens in the presence of disturbances that result in non-linear behavior of the focus error signal.

9. The system of claim 7 wherein the controller is further configured to write data to or retrieve data from the optical media in a vicinity of defects on the optical media that result in non-linear behavior of the focus error signal.

10. The system of claim 7 wherein the controller is further configured to control the position of the astigmatic focusing lens relative to the optical media based on non-linear portions of the focus error signal.

11. A method for controlling an optical pickup unit, the method comprising:
detecting a shape of a beam reflected from an optical media in a vicinity of the optical pickup unit;
generating an s-curve signal based on the shape of the reflected beam;
detecting an intensity of the reflected beam;
generating a sum-curve signal based on the intensity of the reflected beam;
generating a focus error signal that tracks the s-curve signal for values of the sum-curve signal greater than a predefined threshold and that has a constant magnitude for values of the sum-curve signal less than the predefined threshold; and
writing data to or retrieving data from the optical media in a vicinity of defects on the optical media that result in non-linear behavior of the focus error signal.

12. The method of claim 11 further comprising maintaining uninterrupted control of the optical pickup unit in the presence of disturbances that result in non-linear behavior of the focus error signal.

13. The method of claim 11 wherein a sign of the constant magnitude depends on a sign of the last tracked s-curve signal value.

14. The method of claim 13 wherein the value of the constant magnitude depends on surface quality characteristics of the optical media.

* * * * *

UNITED STATES PATENT AND TRADEMARK OFFICE
CERTIFICATE OF CORRECTION

PATENT NO. : 8,339,907 B2
APPLICATION NO. : 12/885932
DATED : December 25, 2012
INVENTOR(S) : Mahnad It is certified that error appears in the above-identified patent and that said Letters Patent is hereby corrected as shown below:

In the Specifications:

In column 4, line 27, delete "brining" and insert -- bringing --, therefor.

Signed and Sealed this
Sixteenth Day of April, 2013

Teresa Stanek Rea
*Acting Director of the United States Patent and Trademark Office*